Patented Dec. 17, 1940

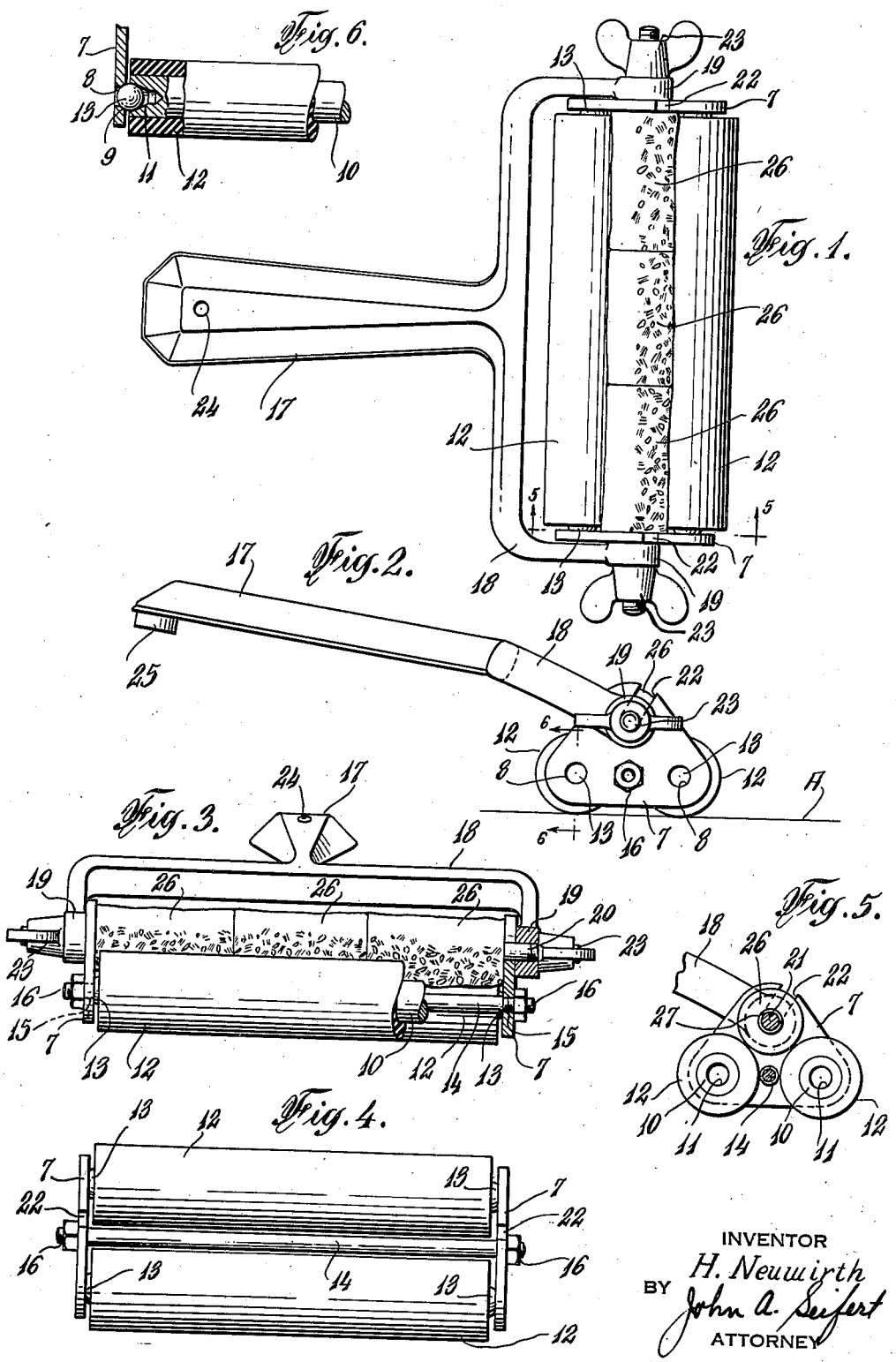

2,225,229

UNITED STATES PATENT OFFICE 2,225,229

RUBBING DOWN DEVICE

Herman Neuwirth, Brooklyn, N. Y., assignor to Testrite Instrument Company, Inc., New York, N. Y., a corporation of New York Application March 26, 1940, Serial No. 326,069

9 Claims. (Cl. 216—61)

This invention relates to rubbing down devices for mounting photographs upon backings by suitable adhesive or rolling prints after they have been removed from the developing baths, and it is the principal object of the invention to provide a device of this character having means adapted to remove the adhesive or moisture from a rubbing down roller of the device and maintain said roller in a dry and clean condition whereby the operation of the device will not mark the photograph, backing or print.

Another object of the invention is to rotatably support a rubbing down roller in a manipulating or mounting member by self-alining bearings whereby said roller may be mounted in a rather flexible or light manipulating or mounting member without causing any binding of the roller in the bearings of the manipulating member by the flexing of one bearing portion of the manipulating or mounting member relative to the other bearing portion of said member.

A further object of the invention is to provide a device for rubbing down photographs or prints whereby the parts of the device may be readily assembled and taken apart and the rubbing down rollers may be used without the moisture removing means being in operative position.

Other objects and advantages of this invention will be disclosed in the detailed description of the embodiment of the invention.

In the drawing accompanying and forming a part of this application, Figure 1 is a top plan view of the device embodying the present invention.

Figure 2 is a side elevational view of the device looking at the bottom of Figure 1.

Figure 3 is a front elevational view of the device looking at the right of Figure 2 and partly in section to show the mountings of a manipulating member and spacer.

Figure 4 is a plan view of the device with a manipulating member and moisture removing means removed to show the self-alining bearing mounting of a pair of rubbing down rollers.

Figure 5 is a side elevational view looking from the line 5—5 of Figure 1 in the direction of the arrows to show the moisture removing means in operative position relative to a pair of rubbing down rollers.

Figure 6 is a fragmentary view, on an enlarged scale, partly in section, taken on the line 6—6 of Figure 2 looking in the direction of the arrows, to show the mounting of a self-alining bearing member in the bearings of a mounting member and a rubbing down roller.

In carrying out the embodiment of the invention illustrated in the accompanying drawing, there is provided a mounting member consisting of a pair of complementary plates 7 of triangular shape with the corners or angles rounded to enhance the appearance thereof and each plate having an opening 8 in two of the corners in alinement with each other and the ends of said openings at the opposed inner faces of the plates being beveled outwardly, as shown at 9 in Figure 6. The side edge of the plates having the openings at the end portions thereof constitutes the bottom of said plates with the pair of openings in each plate in horizontal alinement with each other. A pair of rubbing down rollers comprising a hard core 10 of suitable material, such as steel or wood, having circular sockets or recesses 11 axially in the opposite ends tapering inwardly, and a tubular covering 12 of yielding material, such as rubber, engaged on the core, as shown in Figure 6, are rotatably supported by and between the plates 7 by anti-friction bearings, such as balls 13 of a diameter greater than the diameters of the beveled ends 9 of the openings 8 in the plates 7 and the outer flaring ends of the sockets or recesses 11, which latter diameters may be similar, so that the mounting of said balls in said openings and recesses will space the ends of the rollers from the opposed inner faces of the plates and permit the free rotation of the rollers. The balls 13 are retained in roller supporting position by clamping the plates in spaced relation to each other by suitable means, and shown in the present instance as comprising a tie and spacing rod 14 having the opposite end portions reduced in diameter and engaged in correspondingly alined openings 15 arranged in the plates 7 midway of the openings 8 and preferably in horizontal alinement with said openings 8, the body of the rod being of a length to position the plates a distance apart greater than the length of the rollers 10, 12, but the difference between the lengths of the rollers and body of the tie rod should not be greater than the difference between the diameters of the openings 8 and recesses 11, and the balls 13, so that said balls are retained in supporting position. The portions of the reduced ends of the tie rod 14 are of a length to project from the outer faces of the plates 7 and are screw-threaded for the releasable engagement of nuts, as shown at 16, to draw the shoulders formed on said rod by the reduced ends against the opposed inner faces of said plates and position the ball bearings into supporting engagement wtih the beveled face 9 of the openings 8 and the tapered wall of the sockets or recesses 11 in the roller cores. The nuts 16 may become loose on the reduced ends of the tie rod 14 whereby the plates will turn on said reduced ends and position the openings 8 in one plate out of alinement with the corresponding openings in the other plate. This positioning of the openings 8 out of alinement would ordinarily bind the bearings of the rollers in the plates and prevent the free rotation of the rollers should said bearings be pins fixed in the ends of the rollers and engaged in the openings 8 in accordance with the usual practice, but the ball bearings 13, the beveled faces 9 and the tapered walls of the recesses 11 will form self-alining bearings which will present arcuate bearing surfaces in any angular position of the rollers relative to the plates and prevent binding of the rollers in the mounting plates. Also by so mounting the rollers they are adapted to be self-alining and rotate about the axis of the rollers should one end of the roller be canted as by rubbing down a photo print on a mounting therefor of uneven thickness.

The diameter of the rollers 10, 12 is greater than the distance between the adjacent edges of the plates 7 and the center of the openings 8, so that the circumference of said rollers will extend beyond the bottom edge of the plates and engage the article to be rubbed or pressed, as indicated at A in Figure 2, and the plates 7 are of such size, so that the tie rod is spaced from the rollers, as shown in Fig. 5. A single rubbing down roller 10, 12 may be mounted in the plates 7 in a manner similar to the mounting of the pair of rollers therein.

To facilitate the rubbing or pressing of said article A by the self-alining rollers 12, there is provided a manipulating member comprising a hand grip portion 17 and a bifurcated or yoke portion 18 at one end of the hand grip portion with the parallel free ends of the bifurcation legs arranged with bosses 19 adapted to be rotatably engaged on portions 20 of reduced diameter at the opposite ends of a rod or shaft 21. The manipulating member 17, 18 is releasably connected to the plates 7 by engaging the reduced end portions 20 inwardly of the bosses 19 in slots 22 extending from one side of the vertex of the plates into said plates and terminating in the vertical axis of the plates above the tie rod 14, so that the shaft 21 in abutting relation with the inner closed end of the slots will be in vertical alinement with the tie rod 14. To facilitate the engagement of the reduced end portions 20 in the slots 22, the width of the slots is slightly greater than the reduced end portions 20, but less than the diameter of the body of the shaft 21, and the distance between the bosses 19 is greater than the distance between the outer faces of the plates 7, so that engagement of the bosses with said outer faces will guide the reduced portions into the slots. The manipulating member 17, 18 is releasably and adjustably retained in the slots 22 by clamping the plates 7 between the shoulders formed by the body of the shaft 21 and the reduced portions 20, and the bosses 19 through force applied longitudinally of the shaft by wing nuts adjustably engaged on screw threads arranged on the ends of the reduced portions 20 extending from the outer ends of the bosses 19, as shown at 23. The manipulating member 17, 18 may be loose on the reduced end portions by only drawing the nuts against the bosses 19 with sufficient force as to retain the shaft 21 in the slots 22 and permit adjustment of the manipulating member about the shaft to different angular positions relative to the plates 7. The manipulating member is retained in any desired position relative to the rollers 12 by clamping the bosses against the plates 7 by the nuts 23. To facilitate storing of the device when not in use, the device is adapted to be suspended from a suitable support, such as a hook, by providing a hole 24 in hand grip portion 17 adjacent the free end thereof, and to avoid marring of the wall where the hook is mounted a resilient buffer, such as a rubber knob 25 as shown in Figure 2, is arranged on the under face of the hand grip portion at the free end thereof. The buffer 25 will also absorb the shock and deaden the impact of the hand grip portion with a supporting surface when said hand grip is dropped by the user after the rolling or rubbing down operation is completed.

When the device is used in rubbing down sheet articles adhesively secured to each other, or in rolling photographic prints after they have been removed from developing baths, some of the adhesive or moisture is picked up by the rollers 10, 12 and transferred to the articles or prints thereby marring said articles or prints. It is an object of the invention to avoid this marring of the articles or prints by providing means to remove the adhesive or moisture from the rollers and maintain the rollers in clean and dry condition. In the present embodiment of the invention, this means is shown as comprising a roller of absorbent material, such as sponge, and consisting of a plurality of tubular sections 26 having a bore slightly greater than the diameter of the body of the shaft 21 to be rotatably mounted on said shaft, and the combined sections are of a length to form a tubular roller substantially of the same length as the body of the shaft whereby the entire body of the shaft between the plates 7 forms a fixed supporting core for a roller of absorbent material. The outer diameter or periphery of the absorbent roller sections 26 is such that the engagement of the reduced end portions 20 of the shaft 21 with the inner ends of the slots 22 will position the periphery of the absorbent roller in contact with adjacent peripheral portions of the rollers 12 above the tie rod 14, as clearly shown in Figure 5. The contact between the absorbent roller 26 and the rubbing down rollers 12 will impart rotation to the absorbent roller when the rubbing down rollers are rolled over the article to be rubbed down and the rotation of said absorbent roller will absorb moisture on and keep the rubbing down rollers dry and clean. When it is desired to operate the device in connection with articles which will not moisten the rubbing down rollers, the absorbent roller 26 may be positioned out of contact with the rubbing down rollers by loosening the wing nuts 23 and raising the shaft 21 in the slots 22 a distance to position the roller 26 out of contact with the rollers 10, 12, and when the shaft has been adjusted to a proper distance, the wing nuts 23 are tightened against the bosses 19 to clamp the shaft to the plates 7. To assure the rotation of the absorbent roller sections 26 on the shaft 21 which is usually of steel and may become coated with rust by the moisture absorbed by said roller sections, the roller sections 26 are preferably mounted on a sleeve of non-rusting material, such as copper or brass, having an inner diameter or bore to be rotatably engaged on the body of the shaft 21 and of a length to support said absorbent roller, as shown at 27 in Figure 5.

In assembling the device, the mounting plates 7 are first secured to each other by engaging the plates on the reduced ends of the tie rod 14 and adjusting the nuts 16 onto said reduced ends until one nut abuts its associated plate in fixed position against the shoulder formed by the reduced end of the tie rod, and the other nut adjusted to permit movement of the other plate. A pair of balls 13 are then engaged on the beveled faces 9 of the openings 8 in the fixed plate 7 and the recesses 11 in one end of the rollers 10, 12 are engaged upon said balls. The remaining pair of balls are then engaged in the recesses 11 in the opposite ends of the rollers 10, 12, and then the second nut is adjusted to clamp the loose plate 7 against the shoulder of the tie rod and secure the balls in the openings 8 and recesses 11. The absorbent roller sections 26 are mounted on the shaft 21 while said shaft is passed through the opening in one of the bosses 19 and into the opening in the other boss 19 of the bifurcated portion 18 of the manipulating member. The diameter of the body portion of the shaft 21 is slightly less than the openings in the bosses 19, whereby the shaft may be readily engaged in said bosses and the sleeve 27 carrying the absorbent roller sections 26. After the shaft 21 is properly positioned in the bosses 19 with the absorbent roller sections 26 between the bifurcation legs of the bifurcated portion 18, the wing nuts 23 are loosely engaged on the screw threads of reduced end portions 20 of the shaft to permit the reduced portions 20 between the bosses 19 and the opposite ends of the absorbent roller 26 to be engaged in the slots 22 of the plates 7. The wing nuts 23 are then adjusted to clamp the plates between the bosses 19 and the body of the shaft 21.

Having thus described my invention, I claim:

1. In a rubbing down device, a pair of plates connected in spaced relation to each other, a rubbing down roller rotatably mounted at the opposite ends in opposed portions of the plates, a roller of absorbent material, a shaft mounted in the plates with the ends projecting from the outer face of the plates rotatably supporting the roller of absorbent material between the plates in contact with the rubbing down roller to absorb moisture from said rubbing down roller, and a manipulating member mounted on the projecting ends of the shaft and clamped to the outer faces of the plates.

2. In a rubbing down device, a pair of plates connected in spaced relation to each other and having alined openings and slots therein, a rubbing down roller, self-alining bearings rotatably mounting said roller at the opposite ends in the alined openings in the plates, a shaft mounted in the alined slots in the plates to have adjustment toward and away from the rubbing down roller, a roller of absorbent material rotatable on said shaft to be positioned in contact with the rubbing down roller to absorb moisture from said roller, and a manipulating member mounted on the shaft.

3. A rubbing down device as claimed in claim 2, wherein the manipulating member is arranged with a bifurcated portion having the ends of the bifurcation legs engaged on the opposite ends of the shaft and adapted to be clamped to the outer faces of the plates.

4. In a rubbing down device, a roller having bearings at the opposite ends, a manipulating member having a bifurcated portion, a pair of plates releasably connected to and between the bifurcated portion of the manipulating member and arranged with alined bearings, and bearing members interposed between the bearings of the roller and the bearings of the plates to rotatably support the roller between the plates, the bearing surface of the said bearing members being of arcuate form to assure alining of the roller with the bearing members regardless of the positions of the plates relative to each other.

5. In a rubbing down device, a pair of plates, each plate having a pair of openings adjacent opposite edges, an opening intermediate said openings and a slot extended into an edge thereof, a pair of rubbing down rollers having bearings at the opposite ends adapted to engage the pairs of openings and rotatably support the rollers between the plates, a tie rod engaged in the intermediate openings and adapted to secure the plates together and clamp the plates to the bearings of the rollers, a shaft slidable at the opposite end portions in the slots of the plates to have adjustment toward and away from the rollers, a roller of absorbent material rotatable on the shaft to be positioned in engagement with the rubbing down rollers to absorb moisture therefrom, a manipulating member mounted on the opposite end portions of said shaft projecting from the plates, and means adjustable on said projecting end portions of the shaft to clamp the manipulating member and shaft to the plates and retain the absorbent roller in contact with the rubbing down rollers.

6. A rubbing down device as claimed in claim 5, wherein the plates are of triangular shape with an opening of each pair of openings in an angle portion thereof and the slots extended into the other angle portion whereby the peripheries of the rubbing down rollers extend beyond one edge of the plates and the absorbent roller is positioned above and between the rubbing down rollers.

7. A rubbing down device as claimed in claim 5, wherein the pair of openings in the plates are spaced from each other to position the rubbing down rollers in spaced relation to each other, and the intermediate openings are in alinement with the pairs of openings to position the tie rod in the space between the rollers.

8. In a rubbing down device, a pair of plates having a series of alined openings therein, the wall of one pair of said openings being tapered and diverging outwardly to the inner faces of the plates, a rubbing down roller having inwardly tapered sockets in the opposite ends, balls of slightly larger diameter than and engaging the tapering wall portion of the openings in the plates and sockets in the ends of the rubbing down roller to rotatably support and effect self alining of the roller between the plates, a tie rod having the opposite ends reduced in diameter and extended through another pair of alined openings in the plates, and nuts threaded onto the reduced ends of the tie rod clamping the plates to the shoulders formed by the reduced ends of the tie rod and retain the balls in bearing engagement with the sockets in the ends of the roller and the tapering wall portion of the one pair of openings in the plates.

9. In a rubbing down device, a pair of plates having pairs of alined bearings and alined slots extended inwardly from an edge of the plates to a point between the pairs of alined bearings, rollers having bearings axially in the opposite ends, bearing members engaged in the bearings of the plates and rollers, a tie rod releasably securing the plates together in predetermined spaced relation with the bearing members in operative engagement with the bearings in the plates and rollers and rotatably supporting the rollers between the plates, a shaft engaged in the plate slots adapted to be adjusted toward and away from the bearings of the plates and the end portions projecting from the outer faces of the plates, a roller of absorbent material rotatably supported on said shaft within the plates in engagement with rubbing down rollers to absorb moisture on said rollers, a manipulating member having a bifurcated portion mounted by the bifurcation legs on the projecting ends of the shaft, and nuts threaded onto the ends of the shaft to clamp the bifurcation legs of the manipulating member to the plates and secure the shaft in adjusted position in the plate slots.

HERMAN NEUWIRTH.